(12) United States Patent
Bui et al.

(10) Patent No.: US 12,260,219 B2
(45) Date of Patent: Mar. 25, 2025

(54) MULTIPLE INSTRUCTION SET ARCHITECTURES ON A PROCESSING DEVICE

(71) Applicant: TEXAS INSTRUMENTS INCORPORATED, Dallas, TX (US)

(72) Inventors: Duc Bui, Grand Prairie, TX (US); Timothy D. Anderson, University Park, TX (US); Paul Gauvreau, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/355,939

(22) Filed: Jul. 20, 2023

(65) Prior Publication Data

US 2024/0036866 A1 Feb. 1, 2024

Related U.S. Application Data

(60) Provisional application No. 63/393,029, filed on Jul. 28, 2022.

(51) Int. Cl.
*G06F 9/30* (2018.01)
*G06F 9/38* (2018.01)

(52) U.S. Cl.
CPC ........ *G06F 9/30145* (2013.01); *G06F 9/3802* (2013.01); *G06F 9/3836* (2013.01)

(58) Field of Classification Search
None
See application file for complete search history.

(56) References Cited

U.S. PATENT DOCUMENTS

| 5,638,525 | A | 6/1997 | Hammond et al. |
| 7,996,671 | B2 * | 8/2011 | Chheda ................. G06F 21/125 712/213 |
| 2009/0187742 | A1 | 7/2009 | Greenhalgh et al. |
| 2022/0035635 | A1 | 2/2022 | Wiencke et al. |

FOREIGN PATENT DOCUMENTS

| EP | 0747808 | 12/1996 |
| WO | 2013079910 | 6/2013 |

OTHER PUBLICATIONS

International Search Report for PCT/US2023/028547 mailed Nov. 20, 2023.

* cited by examiner

*Primary Examiner* — Scott C Sun
(74) *Attorney, Agent, or Firm* — Brian D. Graham; Frank D. Cimino

(57) ABSTRACT

Disclosed herein are systems and methods for executing multiple instruction set architectures (ISAs) on a singular processing unit. In an implementation, a processor that includes a first decoder, a second decoder, instruction fetch circuitry, and instruction dispatch circuitry is configured to execute two separate instruction set architectures. In an implementation, the instruction fetch circuitry is configured to fetch instructions from an associated memory. In an implementation the instruction dispatch circuitry is coupled to the instruction fetch circuitry, the first decoder, and the second decoder and is configured to route instructions associated with a first ISA to the first decoder, and route instructions associated with a second ISA to the second decoder.

21 Claims, 6 Drawing Sheets

MULTIPLE INSTRUCTION SET ARCHITECTURES ON A PROCESSING DEVICE

CROSS-REFERENCE TO RELATED APPLICATIONS

This application claims priority to and the benefit of U.S. Provisional Patent Application No. 63/393,029, filed Jul. 28, 2022, which is incorporated by reference herein in its entirety.

TECHNICAL FIELD

Aspects of the disclosure are related to the field of computer hardware and software, and to hardware instruction sets.

BACKGROUND

In the field of computing, central processing units (CPUs) and other processors are designed to execute instructions based on a specific instruction set architecture (ISA). An ISA describes a set of rules defining how a particular processor interprets and processes instructions (i.e., machine code) specific to that processor. Different ISAs have unique characteristics, strengths, and capabilities that impact the performance, power consumption, and other factors of the processor.

There are a variety of ISAs utilized in modern processor designs, such as processor specific ISAs or universal ISAs. Currently, processors, such as digital signal processors (DSPs), may only employ a singular ISA. For example, a DSP may employ an ISA unique to that DSP or a universal ISA from the reduced instruction set computer (RISC) architectures. Unique ISAs allow for efficient processing of signals specific to that processor, while RISC architectures aim to optimize performance by reducing the complexity of instructions.

In some situations, a computing platform may benefit from executing instructions based on multiple and different ISAs to leverage the strengths of each respective ISA. However, traditional processor designs are limited to supporting a single ISA. Some systems support more than one ISA by including a heterogenous set of processors, each with its own respective ISA. However, a need may still exist for unified processing circuitry that can support and efficiently execute instructions from multiple, different instruction set architectures.

SUMMARY

Technology is disclosed herein that provides a unique solution for executing multiple instruction set architectures (ISAs) within a singular processing device. In various implementations, processing circuitry is described herein that executes two separate ISAs, rather than only being able to execute a singular ISA. In one example implementation, processing circuitry comprising first and second decoder circuitries, instruction fetch circuitry, and instruction dispatch circuitry is configured to execute a first and second ISA. The instruction fetch circuitry is configured to fetch instructions related to the first and second ISA from an associated memory. The instruction dispatch circuitry is coupled with the instruction fetch circuitry, the first decoder circuitry, and the second decoder circuitry, and is configured to route instructions to the appropriate decoder circuitry. For example, the instruction dispatch circuitry will route instructions associated with the first ISA to the first decoder circuitry and route instructions associated with the second ISA to the second decoder circuitry.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
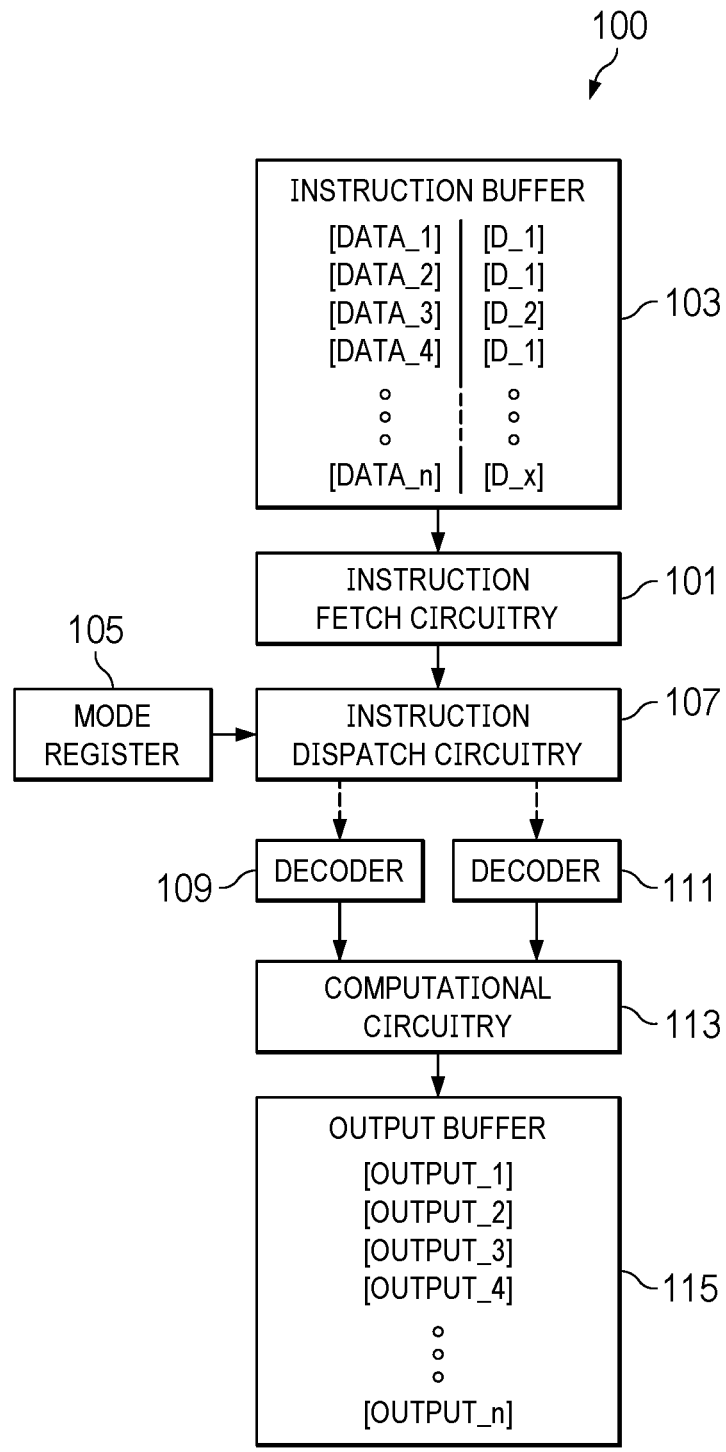
FIG. 1 illustrates a processing system in an implementation.

Systems, methods, and devices are disclosed herein that provide a singular processing device with the ability to interpret instructions from multiple instruction set architectures (ISAs). The disclosed technique(s) may be implemented in the context of hardware, software, firmware, or a combination thereof to provide an apparatus that includes processing circuitry, capable of executing multiple ISAs. In various implementations, a suitable processing system employs multiple decoders to handle instructions from multiple ISAs.

In an embodiment processing circuitry described herein comprises first decoder circuitry, second decoder circuitry, instruction dispatch circuitry, and instruction fetch circuitry. The first and second decoder circuitries are configured to execute instructions from either a first ISA or a second ISA respectively. The instruction fetch circuitry is configured to fetch instructions related to the first and second ISA from an associated memory. The instruction dispatch circuitry is coupled to the instruction fetch circuitry and is configured to receive instructions from the instruction fetch circuitry and dispatch the received instructions to the appropriate decoder circuitry. In an implementation the instruction dispatch circuitry dispatches instructions related to the first ISA to the first decoder circuitry and dispatches instructions related to the second ISA to the second decoder circuitry.

In an implementation, the first decoder circuitry is designed to process and interpret instructions that are associated with a unique ISA. For example, the first decoder circuity may interpret instructions from an ISA specific to the processing circuitry employing the first decoder circuitry. In an implementation, the processing circuitry employing the first decoder circuitry is representative of the C7x digital signal processor (DSP) provided by Texas Instruments, Inc. such that the first decoder circuitry decodes instructions from the C7x ISA for execution.

In an implementation, the second decoder circuitry is tailored to handle instructions associated with a second ISA, such as a general-purpose or universal ISA. For example, the second decoder circuity may interpret instructions associated with a reduced instruction set computer (RISC) architecture. In an implementation, the second decoder circuitry is configured to decode instructions related to the RISC-V architecture for execution.

Technical benefits of the technology disclosed herein include processing circuitry that is designed to maximize efficiency and adaptability of underlying computational circuitry (e.g., functional units) by enabling concurrent decoding of instructions according to multiple ISAs for execution by the common computational circuitry thereby using a single CPU. Concurrent decoding of instructions for multiple ISAs on a single CPU enables quick and seamless switching between ISAs (as compared to running two or more ISA-dedicated CPUs). This innovative approach allows the system to seamlessly handle instructions from multiple ISAs, ensuring compatibility with a wide range of software and hardware components while also enhancing the overall performance of the system. Moreover, supporting multiple ISAs on a single CPU minimizes power consumption and optimizes hardware usage by reusing much or most of the CPU hardware to support the multiple ISAs. In addition, coupling support for a universal ISA with a proprietary ISA increases programming flexibility without increasing power or footprint requirements.

The technological innovations described herein allow a computing system to dynamically switch between two or more ISAs based on the type of instruction being executed or the specific application requirements. This dynamic switching capability allows the processing circuitry to operate optimally in various scenarios, maximizing processing performance and energy efficiency while minimizing the overhead associated with using different instruction sets. For example, by housing dual- or multi-decoder circuitry within the same system, the invention can transition between various instruction sets with ease, catering to the specific requirements of each architecture as needed.

Turning now to the Figures, FIG. 1 illustrates processing architecture 100 for multiple-ISA processing in an implementation. FIG. 1 includes instruction fetch circuitry 101, instruction dispatch circuitry 107, first and second decoders 109 and 111, respectively, and computational circuitry 113. Instruction fetch circuitry 101 receives instructions from instruction buffer 103. Instruction dispatch circuitry 107 receives mode data from mode register 105 for routing instructions to a decoder of first and second decoders 109 and 111. Each of first and second decoders 109 and 111 receives instructions from instruction dispatch circuitry 107 and decodes the instructions according to its associated ISA to provide a corresponding set of operations to computational circuitry 113 shared between the decoders 109 and 111. Computational circuitry 113 executes operations based on the decoded logic and transmits output generated according to the instructions to output buffer 115.

Instruction buffer 103 is representative of a buffer or cache that stores instructions received from main memory (not shown) and feeds the instructions to instruction fetch circuitry 101 for further processing. Instruction buffer 103 may store instructions with multiple ISAs, such as the ISAs of first and second decoders 109 and 111. In various implementations, instruction buffer 103 may include a FIFO (first-in-first-out) buffer, a circular buffer, or a double buffer.

Instruction fetch circuitry 101 is representative of circuitry that fetches instructions from an instruction buffer, such as instruction buffer 103, and feeds the instructions to instruction dispatch circuitry 107. Instruction fetch circuitry 107 may include components such as address and data busses, an instruction cache, and a control unit. Instruction fetch circuitry 101 may include circuitry types such as sequential fetch circuitry, prefetching circuitry, branch prediction circuitry, or trace cache circuitry.

Instruction dispatch circuitry 107 is representative of circuitry which receives instructions from instruction fetch circuitry 101 and dispatches the instructions to a decoder, such as first decoder 109 or second decoder 111, according to an ISA indicator received from mode register 105. In an implementation, instruction dispatch circuitry 107 routes instructions associated with a first ISA to first decoder 109 and instructions associated with a second ISA to second decoder 111. For example, the first ISA may be a proprietary or specialized ISA, while the second ISA may be a general-purpose ISA, or vice versa. The ISA indication may be provided for each instruction individually or according to a sequence of instructions.

First and second decoders 109 and 111 are representative of circuitry that receives a fetched instruction and interprets the instruction according to an ISA of the decoder to determine a set of operations for execution. First decoder 109 is associated with a first ISA, and second decoder 111 is associated with a second ISA which differs relative to the first ISA. For example, the first ISA of the first decoder 109 may be a DSP architecture, while the second ISA of the second decoder 111 may be a RISC architecture. A decoder, such as first decoder 109 or second decoder 111, decodes an instruction to cause computational circuitry 113 to execute one or more operations according to the opcode of the instruction on one or more operands decoded from the instruction. With the relevant information decoded from the instruction, the decoder generates a set of operations (e.g., micro-operations or microcode instructions) which are executed by the execution or processing units of computational circuitry 113. The decoder also produces control signals that coordinate the flow of data and operations between various units of the processor, such as the register file, the arithmetic logic unit (ALU), and the memory units. The decoder also decodes operands of the instruction, which may include register references, immediate values, memory addresses, or other data sources required for the operation. An instruction received by the decoder may include branch conditions, such as comparisons or checks against status flags, and determine a target address for the branch. The decoder may also handle branch prediction or branch target prediction mechanisms to speculatively fetch subsequent instructions based on predicted outcomes.

In an implementation, a decoder of first and second decoders 109 and 111 receives an instruction from instruction dispatch circuitry 107. First decoder 109 is configured to decode instructions according to a first ISA; second decoder 111 is configured to decode instructions according to a second ISA. Instructions are routed to first decoder 109 or second decoder 111 according to the ISA associated with the instruction. First and second decoders 109 and 111 may also decode registers from an instruction. The registers associated with the convolution operation may include registers which hold binary weight values and the binary data values on which the operation is performed. The instruction may also include output or destination registers for storing the output of the operation.

Computational circuitry 113 is representative of circuitry which performs operations on operands according to the decoded instructions from a decoder of first and second decoders 109 and 111. Computational circuitry 113 may include any number of different processing units including load-store units, fixed and/or floating point computational units, vector arithmetic units, matrix arithmetic units, computational accelerators, and/or other computing circuitry. Computational circuitry 113 may also include other components, such as control registers and register files used in executing instructions for the multiple ISAs of processing architecture 100. In various implementations, the processing units and/or other components are reused between or amongst the multiple ISAs according to a mapping of operations, registers, execution units, and so on.

In an implementation, computational circuitry 113 includes logic for executing first-ISA instructions. Second-ISA instructions may include instructions not found in the first ISA as well as instructions which are common to or overlap with the first ISA. Commonality among multiple ISAs allows common hardware components to be reused, such as register files, adders, multipliers, branch predictors, address generation logic, and so on. For second-ISA instructions that are unique to the second ISA (e.g., for which first-ISA logic is not adaptable), computational circuitry 113 includes additional logic for performing those operations which are unique to the second ISA.

In various implementations, computational circuitry 113 includes register files, execution units, and control registers. Register files include storage elements or registers which store operands temporarily during various stages of instruction execution. A register file may include multiple registers, with each register capable of storing a fixed number of bits. The number and size of registers may vary depending on the processor architecture. Common register file designs include general-purpose registers for general data store and manipulation and specialized registers for specific purposes like program counters, instruction pointers, and status flags.

Execution units of computational circuitry 113 perform specific operations or instructions. Execution units are designed to carry out arithmetic, logic, and data manipulation operations. Different types of execution units can be tailored for specific operations, such as floating-point arithmetic, vector operations, branch prediction, and so on.

Control registers of computational circuitry 113 include special-purpose registers that store control information for controlling processor behavior, such as interrupt handling, memory management, virtualization, and so on. Control registers can include program counters, timers, flags for indicating processor status (e.g., carry, overflow, interrupt enable/disable).

Instructions and registers associated with instructions of one ISA may be mapped to instructions and registers of the second ISA. In an implementation, a C7x architecture is adapted to run RISC-V ISA according to the technology disclosed herein by mapping instructions, register sets, and register files from the RISC-V ISA to the C7x ISA. For example, the LD instruction of a RISC-V ISA can be mapped to the LDD instruction of a C7x ISA, with both instructions using the .D1 register unit or file. Similarly, the fixed-point and floating-point general registers of the 64-bit RISC-V ISA can be mapped to general registers of the C7x ISA, while various control registers of the RISC-V ISA can be mapped to control registers of the C7x ISA.

Output buffer 115 is representative of a buffer or cache that receives output from computational circuitry 113 resulting from the execution of first-ISA and second-ISA instructions. Output buffer 115 stores output resulting from executing instructions which may be transferred to processor main memory or may be subject to further processing by processing architecture 100. In various implementations, output buffer 115 may include a FIFO (first-in-first-out) buffer, a circular buffer, or a double buffer.

In an implementation, processing architecture 100 supports a first and second ISA, with components of processing architecture 100 working in tandem to ensure that instructions from both instruction sets are fetched, routed, decoded, and executed. In operation, instruction fetch circuitry 101 fetches instructions from instruction buffer 103, including instructions for the first or the second ISA. Instruction fetch circuitry 101 feeds the instructions to instruction dispatch circuitry 107 which routes each instruction to the appropriate decoder of first and second decoders 109 and 111. First decoder 109 supports a first ISA; second decoder 111 supports a second ISA distinct from the first ISA. For example, the first ISA may be a DSP or other specialized architecture, while the second ISA may be a general architecture. Instruction dispatch circuitry 107 routes instructions for the first ISA to first decoder 109 and instructions for the second ISA to second decoder 111 according to the mode of the instruction provided by mode register 105. Upon execution of the instruction by computational circuitry 113, output from the execution is sent to output buffer 115 for storage, further processing, etc.

Figure 2:
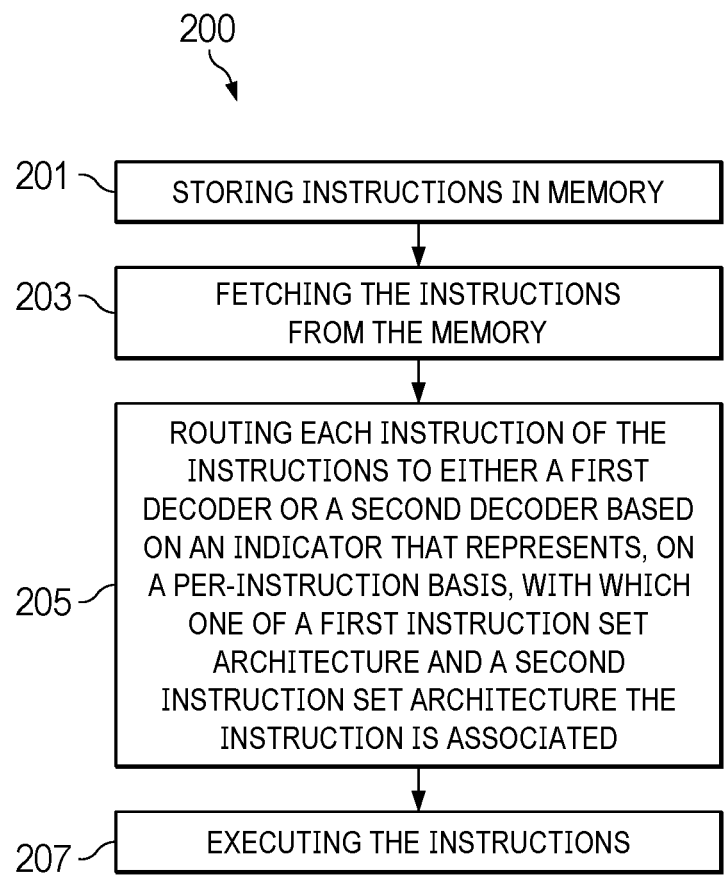
FIG. 2 illustrates a method of operating a processing system in an implementation.

FIG. 2 illustrates process 200 for operating a multi-ISA processing architecture in an implementation. In process 200, a processing circuitry stores instruction in memory (step 201). Fetch circuitry of the processing circuitry fetches instructions from memory (step 203).

Fetch circuitry feeds the instructions to dispatch circuitry which routes each instruction to a first decoder or second decoder based on whether the instruction is to be executed according to a first ISA or a second ISA (step 205). In an implementation, the dispatch circuitry receives an indication from a mode register which indicates the ISA of an instruction to be executed. The mode may be received from the mode register on a per-instruction basis, and the processing circuitry may switch processing of a sequence of instructions between two (or more) ISAs.

In some implementations, second decoder 111 of FIG. 1, decodes second-ISA instructions according to the second ISA as mapped to computational circuitry 113. The mapping may indicate analogous instructions between the first and second ISAs. Additionally, for executing second-ISA instructions, register files of the second ISA may be mapped onto register files of the first ISA; execution units of the second ISA may be mapped onto execution units of the first ISA; and control registers of the second ISA may be mapped onto control registers of the first ISA.

With a fetched instruction decoded according to the decoder identified by the dispatch circuitry, the instruction is executed (step 207). In an implementation, the instruction is executed by computational circuitry which supports the first and second ISAs. The computational circuitry may be augmented with logic to support those aspects of the second ISA which are otherwise not supported by the computational circuitry, such as second-ISA instruction which cannot be mapped to the first ISA or for which there is no analogue in the first ISA. Subsequent to execution of the instruction, the output is routed to an output buffer.

Referring again to FIG. 1, processing architecture 100 admits a brief example of process 200 as employed by elements of processing architecture 100.

In an exemplary operational scenario, instruction fetch circuitry 101 fetches instructions from instruction buffer 103, where the instructions are cached from processor main memory (not shown). Instruction fetch circuitry 101 sends the instructions to instruction dispatch circuitry 107, which routes each instruction to first decoder 109 or second decoder 111. To route the instructions, instruction dispatch circuitry 107 receives an indicator from mode register 105 which indicates the ISA of the instruction for routing. Subsequent to the execution of the instruction by computational circuitry 113, the output generated by computational circuitry 113 is routed to output buffer 115.

Figure 3A:
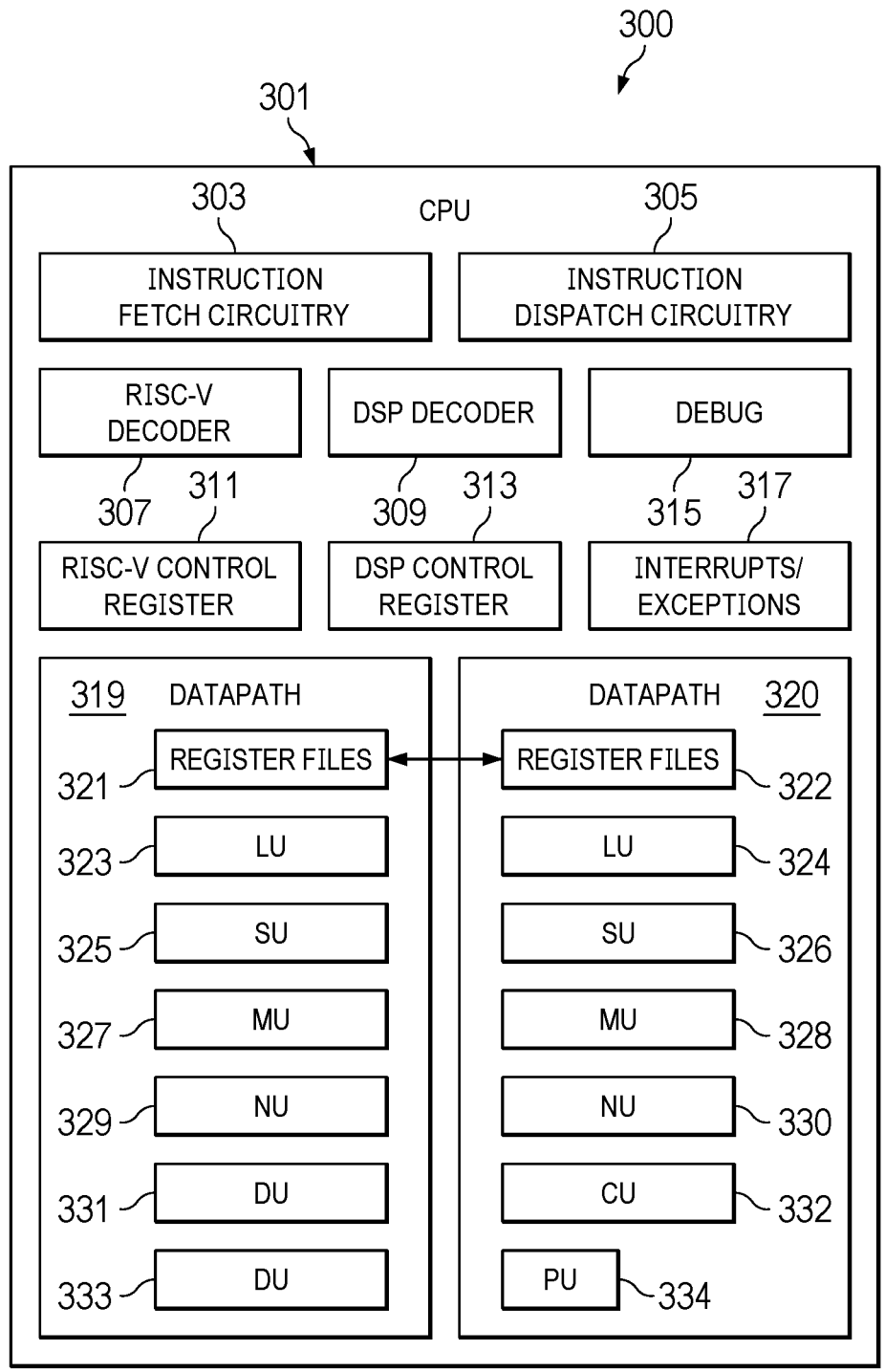
FIG. 3A illustrates an example processing system in an implementation.
Figure 3B:
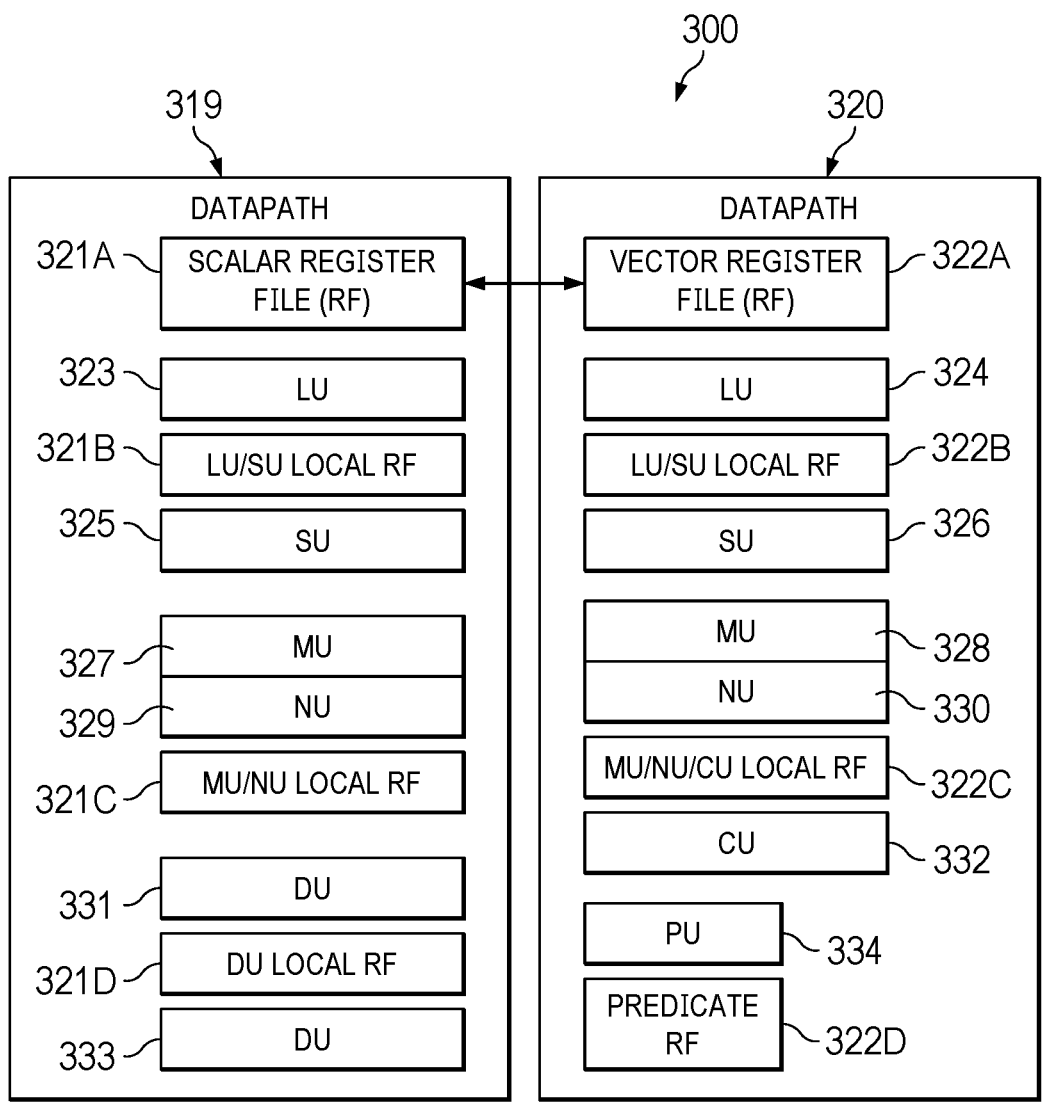
FIG. 3B illustrates an example register file for the processing system of FIG. 3A.

FIGS. 3A and 3B illustrate processing architecture 300 for dual-ISA processing by a C7x DSP in an implementation. In FIG. 3A, DSP 301 includes instruction fetch circuitry 303, instruction dispatch circuitry 305, RISC-V decoder 307, RISC-V control register 311, DSP decoder 309 and DSP control register 313. Instruction fetch circuitry 303 and instruction dispatch circuitry 305 may be examples of instruction fetch circuitry 101 and instruction dispatch circuitry 107 of FIG. 1, respectively. Similarly, RISC-V decoder 307 and RISC-V control register 311 may be an example of decoder 109, and DSP decoder 309 and DSP control register 313 may be an example of decoder 111. Processing architecture 300 also includes 64-bit data path 319 associated with RISC-V control register 311 and 256-bit data path 320 associated with DSP control register 313. Data path 319 includes register files 321 and scalar processing units LU 323, SU 325, MU 327, and NU 329, and data movement processing units DU 331 and DU 333. Data path 320 includes register files 322 and vector processing units LU 324, SU 326, MU 328, NU 330, and CU 332, and predication processing unit PU 334. Processing architecture 300 also includes debug module 315 and interrupts/exceptions module 317. In an example, the data paths 319 and 320 are elements of computational circuitry 113 of FIG. 1.

FIG. 3B illustrates in greater detail components of the data paths 319 and 320, including the processing units along with register files 321A-D and 322A-D associated with various ones of the processing units.

In an exemplary operation of processing architecture 300, instruction fetch circuitry 303 fetches instructions cached by an instruction buffer (not shown). To fetch an instruction, instruction fetch circuitry 303 receives a read request including the address of a packet to be fetched. Instruction fetch circuitry 303 accesses the instruction buffer according to the address to fetch the packet and sends the packet to instruction dispatch circuitry 305.

To route an instruction to the appropriate decoder of RISC-V decoder 307 and DSP decoder 309, instruction dispatch circuitry 305 receives the mode of the instruction (RISC-V or DSP) from a mode register (not shown). When a RISC-V instruction is received, instruction dispatch circuitry 305 routes the instruction to RISC-V decoder 307 which decodes the instruction according to the RISC-V ISA. Similarly, when a DSP instruction is received, instruction dispatch circuitry 305 routes the instruction to DSP decoder 309 which decodes the instruction according to the DSP ISA.

In an implementation, to execute a RISC-V instruction, RISC-V decoder 307 decodes the instruction for processing by RISC-V control register 311 and elements of 64-bit data path 319. The RISC-V general register file, which includes two register sets of 64 bit by 32 entries, maps to the C7x mode general registers of DSP 301, an example of which is shown in table 410 of FIG. 4. In addition, the RISC-V control registers map to the C7x control and status registers as follows: FRM (floating point rounding mode) maps to RMODE of C7x FPCR register, and FFLAGS (floating point flats) map to the NX, NV, DZ, OF, UF, and NX of C7x FSR register. In addition, the (M)CYCLE timer maps to the C7x TSC CR and the (M)TIME is mapped to the C7x GTSC register, while the (M)INSTRET, which has no equivalent register in C7x, so a stand-alone register is added for it. A PMODE register for mode control is added to this RISC-V implementation which maps to the TSR.RISCV bit of the C7x TSR control register. The PMODE register enables the processor to switch from RISC-V mode to C7x mode when the processor receives an interrupt (discussed below).

In an implementation of mode switching between RISC-V and C7x/DSP modes, to switch to the RISC-V mode, an instruction turns on the RISC-V bit in the TSR register. In doing so, the processing pipeline is flushed and the fetched RISC-V instruction is decoded in RISC-V mode by the RISC-V decoder which allows the computational circuitry to process the RISC-V instruction. To switch from the RISC-V mode to the C7x mode, the processor issues a write to the custom PMODE CSR (control and status register) which maps to the C7x RISC-V bit in TSR. This again causes a pipeline flush followed by fetching instructions to be decoded with the C7x decoder. When the RISC-V mode of operation is interrupted the processor will switch into C7x mode by writing into the RISC-V bit in TSR. When the processor returns from the interrupt, the original state of the RISC-V bit will be restored and operation will continue in RISC-V mode.

Figure 4:
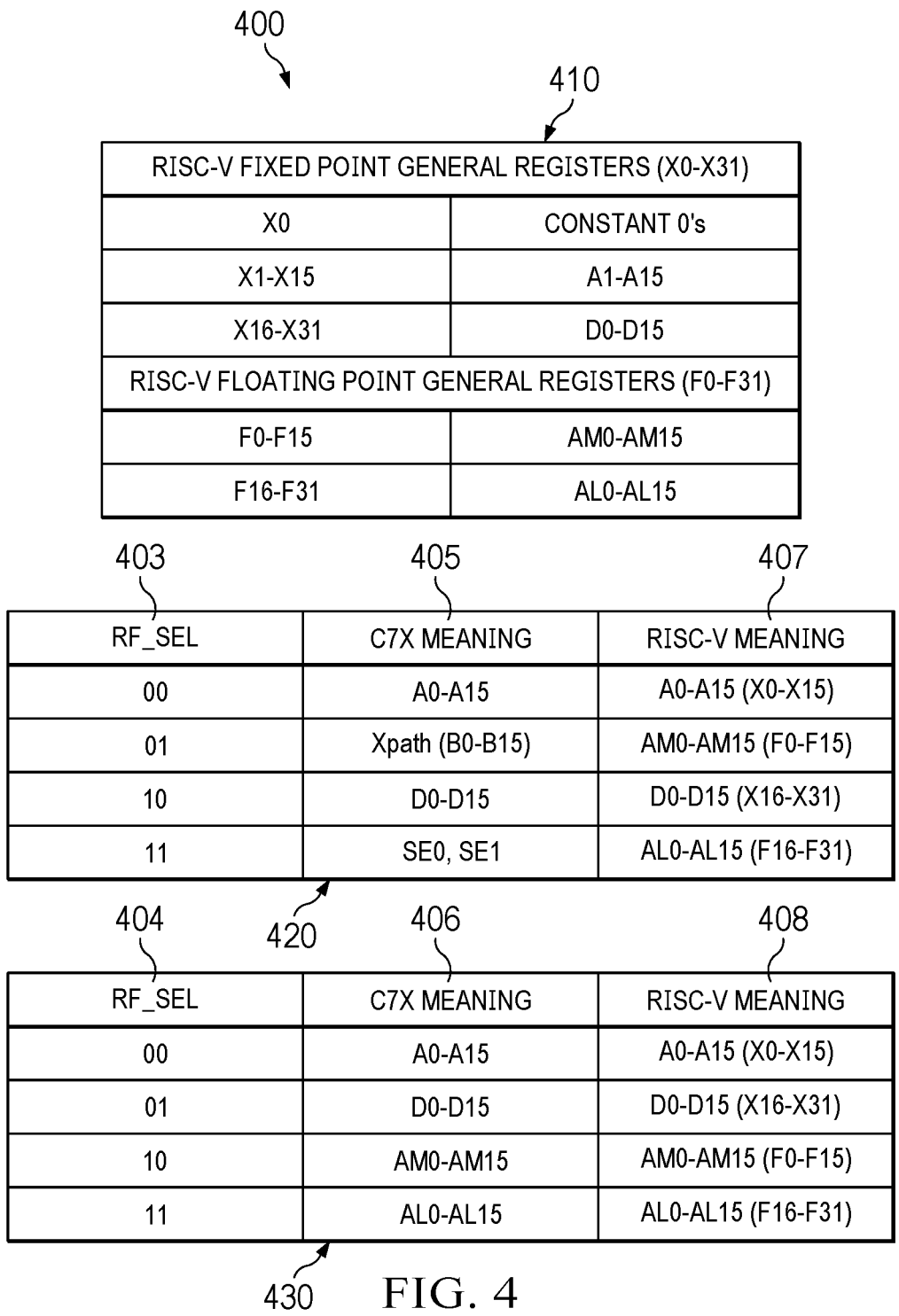
FIG. 4 illustrates a results table in an implementation.

FIG. 4 illustrates the mapping for RISC-V register files and registers to C7x register files and registers. As discussed above, table 410 illustrates a mapping between RISC-V control registers and C7x control registers. Tables 420 and 430 refer to mappings for RISC-V store and write instructions, respectively. C7x instructions have a 6-bit encoding for each register file source operand, with the first two bits indicating the selected register file and the remaining four bits indicating which register to use within the register file. When a RISC-V store instruction arises, table 420 illustrates the corresponding mapping to C7x registers. In table 420, values for RF_SEL 403 corresponding to the first two bits of the selected register are mapped to C7x meanings 405 and to RISC-V meanings 407 of fixed-point and floating-point registers for the RISC-V architecture. When a RISC-V write instruction arises, table 430 illustrates the corresponding mapping to C7x registers. In table 430, values for RF_SEL 404 correspond to C7x meanings 406 and to RISC-V meanings 408 of fixed-point and floating-point registers for the RISC-V architecture.

Figure 5:
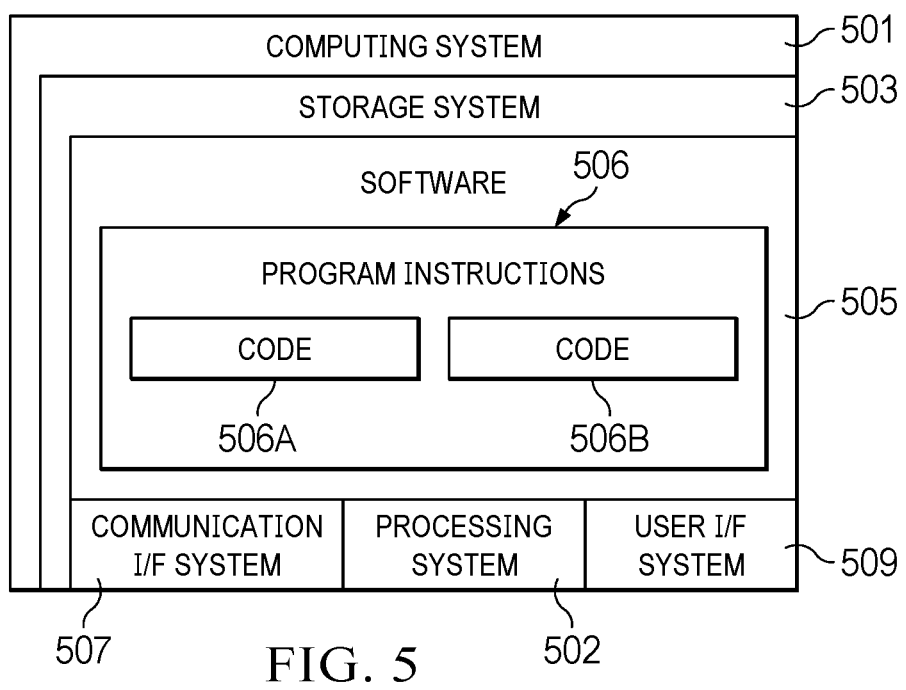
FIG. 5 illustrates a computing system suitable for implementing the various operational environments, architectures, processes, scenarios, and sequences discussed below with respect to the other Figures.

It may be appreciated that the foregoing implementations may be implemented in the context of a variety of computing devices including—but not limited to—embedded computing devices, industrial computers, personal computers, server computers, automotive computers, MCUs, and the like. As such, the technology disclosed herein also contemplates software products produced by compilers capable of generating binary convolution instructions as disclosed herein. That is, the technology disclosed herein includes compiled software programs having binary convolution instructions amongst their program instructions. FIG. 5 illustrates computing device 501, which is representative of such computers.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes program instructions 506, which includes code 506A and code 506B. When executed by processing system 502, software 505 directs processing system 502 to operate as described herein for at least the various processes, operational scenarios, and sequences discussed in the foregoing implementations. Computing device 501 may optionally include additional devices, features, or functions not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include one or more general purpose central processing units, graphical processing units, microprocessors, digital signal processors, field-programmable gate arrays, application specific processors, processing circuitry, analog circuitry, digital circuitry, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 is implemented in program instructions 506 and among other functions may, when executed by processing system 502, direct processing system 502 to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to support binary convolution operations. Indeed, encoding software 505 (and binary convolution instructions 508) on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary, etc.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. Processing circuitry comprising:
   first decoder circuitry;
   second decoder circuitry;
   instruction fetch circuitry configured to fetch instructions from memory;
   instruction dispatch circuitry coupled with the instruction fetch circuitry, the first decoder circuitry, and the second decoder circuitry, and configured to:
     route instructions associated with a first instruction set architecture to the first decoder circuitry; and
     route instructions associated with a second instruction set architecture to the second decoder circuitry.

2. The processing circuitry of claim 1 wherein the instruction dispatch circuitry is configured to route each instruction of the instructions to either the first decoder circuitry or the second decoder circuitry based on an indicator that represents, on a per-instruction basis, with which one of the first instruction set architecture and the second instruction set architecture the instruction is associated.

3. The processing circuitry of claim 2 wherein the first instruction set architecture and the second instruction set architecture differ relative to each other, and wherein those of the instructions associated with the first instruction set architecture comprise program instructions compiled for the first instruction set architecture.

4. The processing circuitry of claim 3 wherein those of the instructions associated with the second instruction set architecture comprise program instructions compiled for the second instruction set architecture.

5. The processing circuitry of claim 4 wherein the first instruction set architecture comprises a digital signal processing (DSP) architecture.

6. The processing circuitry of claim 5 wherein the second instruction set architecture comprises a reduced instruction set computer (RISC) architecture.

7. The processing circuitry of claim 4 further comprising computational circuitry configured to execute the instructions.

8. An apparatus comprising:
   a memory having instructions stored thereon, wherein the instructions include first instructions associated with a first instruction set architecture and second instructions associated with a second instruction set architecture; and
   a processing device coupled with the memory, wherein the processing device comprises a first decoder, a second decoder, instruction fetch circuitry, instruction dispatch circuitry, and computational circuitry;
   wherein the instruction fetch circuitry is configured to fetch the instructions from the memory;
   wherein the instruction dispatch circuitry is configured to route the first instructions to the first decoder and route the second instructions to the second decoder;
   wherein the first decoder is configured to decode the first instructions;
   wherein the second decoder is configured to decode the second instructions; and
   wherein the computational circuitry is configured to execute the first and second instructions.

9. The apparatus of claim 8 wherein the instruction dispatch circuitry is configured to route each instruction of the instructions to either the first decoder or the second decoder based on an indicator that represents, on a per-instruction basis, with which one of the first instruction set architecture and the second instruction set architecture the instruction is associated.

10. The apparatus of claim 9 wherein the first instruction set architecture and the second instruction set architecture differ relative to each other.

11. The apparatus of claim 10 wherein those of the instructions associated with the first instruction set architecture comprise instructions compiled for the first instruction set architecture.

12. The apparatus of claim 11 wherein those of the instructions associated with the second instruction set architecture comprise instructions compiled for the second instruction set architecture.

13. The apparatus of claim 12 wherein the first instruction set architecture comprises a digital signal processing (DSP) architecture.

14. The apparatus of claim 13 wherein the second instruction set architecture comprises a reduced instruction set computer (RISC) architecture.

15. A method comprising:
   storing instructions in memory;
   instruction fetch circuitry fetching the instructions from the memory;
   instruction dispatch circuitry routing each instruction of the instructions to either a first decoder or a second decoder based on an indicator that represents, on a per-instruction basis, with which one of a first instruction set architecture and a second instruction set architecture the instruction is associated; and
   computational circuitry executing the instructions.

16. The method of claim 15 wherein routing each instruction of the instructions to either the first decoder or the second decoder comprises:

routing a first subset of the instructions associated with the first instruction set architecture to the first decoder; and routing a second subset of instructions associated with the second instruction set architecture to the second decoder.

17. The method of claim 16 wherein the first instruction set architecture and the second instruction set architecture differ relative to each other, and wherein the first subset of the instructions associated with the first instruction set architecture comprise instructions compiled for the first instruction set architecture.

18. The method of claim 17 wherein the second subset of the instructions associated with the second instruction set architecture comprise instructions compiled for the second instruction set architecture.

19. The method of claim 18 wherein the first instruction set architecture comprises a digital signal processing (DSP) architecture.

20. The method of claim 19 wherein the second instruction set architecture comprises a reduced instruction set computer (RISC) architecture.

21. A computing apparatus comprising:

one or more computer readable storage media; and program instructions stored on the one or more computer readable storage media;

wherein the program instructions, when fetched by instruction fetch circuitry, are routed to instruction dispatch circuitry, and wherein the instruction dispatch circuitry routes each instruction of the program instructions to either a first decoder or a second decoder based on an indicator that represents, on a per-instruction basis, with which one of a first instruction set architecture and a second instruction set architecture the instruction is associated.

* * * * *